US009356935B2

(12) United States Patent
Lester et al.

(10) Patent No.: US 9,356,935 B2
(45) Date of Patent: May 31, 2016

(54) SELECTIVE ACCESS TO PORTIONS OF DIGITAL CONTENT

(75) Inventors: James Lester, Dublin, CA (US); Steven Clifford Gottwals, Morgan Hill, CA (US); James D. Pravetz, Sunnyvale, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 1607 days.

(21) Appl. No.: 11/520,273

(22) Filed: Sep. 12, 2006

(65) Prior Publication Data

US 2008/0066185 A1     Mar. 13, 2008

(51) Int. Cl.
    *H04L 9/08*     (2006.01)
    *H04L 29/06*     (2006.01)
    *G06F 21/10*     (2013.01)

(52) U.S. Cl.
    CPC .............. *H04L 63/101* (2013.01); *G06F 21/10* (2013.01); *G06F 2221/2147* (2013.01); *G06F 2221/2149* (2013.01)

(58) Field of Classification Search
    CPC ............................. H04L 63/10; H04L 63/101
    USPC .......... 726/27, 2–4; 713/182; 707/9; 709/225
    See application file for complete search history.

(56) References Cited

U.S. PATENT DOCUMENTS

| | | | | |
|---|---|---|---|---|
| 6,824,051 | B2 * | 11/2004 | Reddy et al. ................... | 235/380 |
| 7,046,807 | B2 * | 5/2006 | Hirano et al. ................. | 380/234 |
| 7,281,273 | B2 * | 10/2007 | Strom et al. .................... | 726/27 |
| 7,334,720 | B2 * | 2/2008 | Hulst et al. .................... | 235/380 |
| 2002/0112035 | A1 | 8/2002 | Carey et al. | |
| 2006/0242558 | A1 * | 10/2006 | Racovolis et al. ............ | 715/511 |
| 2006/0259614 | A1 * | 11/2006 | Patrick .......................... | 709/224 |
| 2006/0280301 | A1 * | 12/2006 | Oliveira et al. ............... | 380/212 |
| 2007/0162390 | A1 * | 7/2007 | Pancholy et al. .............. | 705/50 |
| 2008/0140433 | A1 * | 6/2008 | Levy et al. ....................... | 705/1 |

FOREIGN PATENT DOCUMENTS

WO     WO-2008/033445     3/2008
WO     WO-2008033445 A2     3/2008

OTHER PUBLICATIONS

"International Application Serial No. PCT/US2007/019897, Search Report and Written Opinion mailed Jul. 23, 2008", P220.
"Adobe Lifecycle Policy Server—datasheet", Adobe Systems, Inc. San Jose, CA, (2005),2 pgs.

* cited by examiner

*Primary Examiner* — Josnel Jeudy
(74) *Attorney, Agent, or Firm* — Shook, Hardy & Bacon L.L.P.

(57) ABSTRACT

A method includes receiving a request to access a digital content item, the digital content item including multiple portions. Responsive to the request, multiple policies relating respectively to the multiple portions of the digital content item are identified. Access to the multiple portions of the digital content item is selectively enabled, based on the multiple policies.

12 Claims, 7 Drawing Sheets

SELECTIVE ACCESS TO PORTIONS OF DIGITAL CONTENT

FIELD

This application relates to a method and system to selectively enable access to digital content and, in one example embodiment, to a system to implement policy-based access to portions of a digital content item.

BACKGROUND

The effective management and control of digital content (e.g., electronic photographs, music, video and documents) is becoming increasingly important as the volume of such content proliferates at an exponential rate. Digital Rights Management (DRM) is typically refers to a number of technologies used to enforce pre-defined policies for controlling access to digital data or content. Typically, DRM handles the description, layering, analysis, evaluation, trading, monitoring and enforcement of usage restrictions that may accompany a specific instance (or item) of digital content.

A large number of DRM technologies are currently available to protect a variety of different types of digital content. For example, the Portable Document Format (PDF) is an open standard file format, developed by Adobe Systems Incorporated, of San Jose Calif., that provides a capability to restrict document printing.

Adobe Systems Inc. has further developed the Adobe® LiveCycle Policy Server™ software that enables the management and monitoring of business-critical electronic documents, and the application of policies to control access to, and use of, such documents. Similarly, Macrovision Corporation has developed a number of electronic copy prevention schemes that may be utilized to protect video and DVD digital content. Audio files purchased from many online stores (e.g., the iTunes Music Store of Apple Computer Corp.) are subject to various DRM schemes that limit the number of devices on which a particular audio file may be played. Similarly, producers of e-books utilize DRM to limit the number of computers on which an e-book may be viewed or even the number of times that the e-book may be viewed.

BRIEF DESCRIPTION OF DRAWINGS

Some embodiments are illustrated by way of example and not limitation in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

Embodiments may, for example, be implemented as a standalone application (e.g., without any network capabilities), a client-server application or a peer-to-peer (or distributed) application. Embodiments may, for example, be deployed by Software as a Service (SaaS), Application Service Provider (ASP), or utility computing providers, in addition to being sold or licensed via traditional channels.

The term "content" shall be taken to include any digital data that may be presented to a consumer (e.g., visually or audibly presented) and may include document, image, video and audio content, merely for example. A "portion" of content shall include any part or share of content that is defined or discernible as a part or share. For example, a portion may be automatically discerned from a characteristic of the content itself (e.g., a paragraph of an electronic document) or may be manually defined by a user (e.g., a user selected collection of words in a document, or a user selected portion of a digital image).

In one example embodiment, an access management system includes an interface module to present multiple portions of a digital content item (e.g., a digital document, photo, video or audio file) to a user for selection. The interface module furthermore receives the selection of a portion of the multiple portions of the digital content item, and also receives an access specification with respect to the selected portion of the multiple portions of the digital content item. The access management system further includes an association module to associate the access specification with the selected portion of multiple portions of the digital content item.

According to a further example embodiment, a system includes an interface module to receive a request to access a digital content item, the digital content item including multiple portions. A policy module of the access management system, responsive to the request, identifies multiple policies relating respectively to the multiple portions of the digital content item. The policy module is further selectively to enable access to each of the multiple portions of the digital content item, based on the multiple policies.

Figure 1:
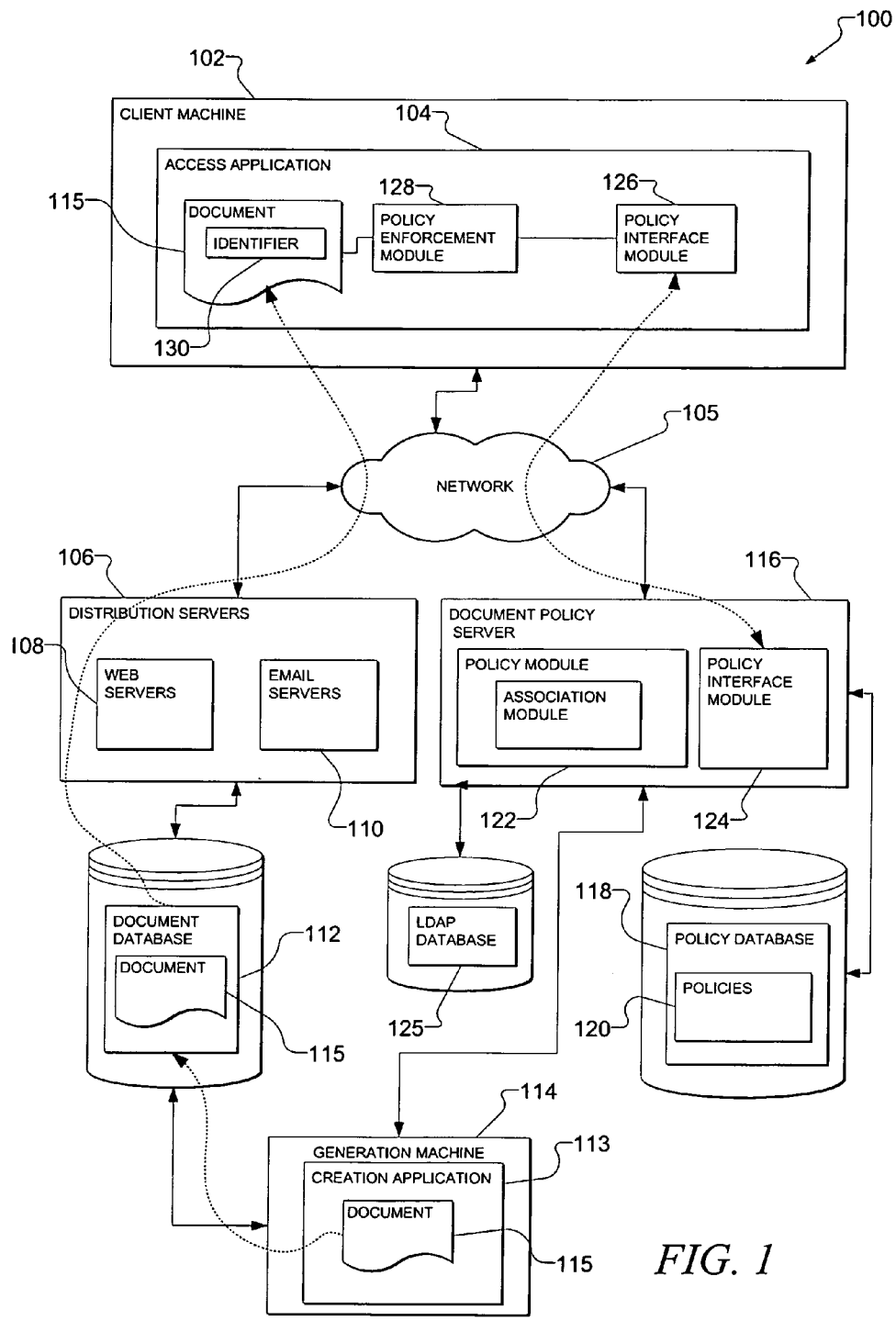
FIG. 1 is a block diagram illustrating an access management system, according to an example embodiment.

FIG. 1 is a block diagram illustrating an access management system 100, according to an example embodiment. While the example access management system 100 is described within the context of access management digital content items in the example form of electronic documents, it will be appreciated that other embodiments may operate to manage access to any one of a number of different types of digital content items (e.g., digital photographs, videos or audio files). The access management system 100 includes a client machine 102 hosting a document access application 104. The client machine 102 is communicatively coupled via a network 105 to document distribution servers 106, in the example form of web servers 108 and email servers 110. The document distribution servers 106 are in turn communicatively coupled to a document database 112, and operate to make digital documents (as examples of digital content items) stored in the document database 112 available to the document access application 104 via the network 105. For example, documents may be emailed from the document database 112 via the email servers 110 to the document access application 104, either at the instruction of a sender of a document or at the request of a user of the client machine 102. Documents may also be delivered from the document database 112 via the web servers 108 to the document access application 104 utilizing any one of a number of well known web-based delivery protocols (e.g., the Hypertext Transfer Protocol (HTTP) or the File Transfer Protocol (FTP)).

The document database 112, in turn, may be populated by documents 115 generated by a document generation machine 114. To this end, the document generation machine 114 may host any one of a number of creation (e.g., document authoring) applications 113 (e.g., Microsoft Word or Adobe Acrobat®) that enable a user to generate or edit a content item, and/or enable a user to associate an access specifications (e.g., the policy) with respect of portions of the content item.

While, in the example embodiment shown in FIG. 1, the delivery of documents to the document access application 104 is shown to occur via an electronic transmission over the network 105, it will be appreciated that documents may be delivered to the document access application 104 in any number of ways, such as by mailing the document to an operator of the client machine 102 on a Compact Disc (CD).

The document access application 104 also has access to a document policy server 116 that operates to manage and to monitor access to documents within the document database 112. Specifically, the document policy server 116 may access a document policy database 118 storing a collection of document policies 120. The document policy server 116 uses the document policies 120 to control access to, and the use of, electronic documents, for example in both an online and offline manner. In addition to maintaining control of electronic documents by utilizing document policies 120, the document policy server 116 may enable the authoring of document policies 120. To this end, the document generation machine 114 is shown to have access to the document policy server 116, and may accordingly allow a document author to assign permissions that specify a level of access to a specific document (e.g., restrictions or permissions with respect to printing, copying, adding or removing pages, forwarding or saving the relevant document etc.). The document policy server 116 also facilitates the management of document policies associated with a particular document, thereby allowing an author to make policy changes with respect to a document subsequent to distribution, for example, via the document distribution servers 106.

Dealing more specifically with the document policy server 116, a policy module 122 facilitates the creation and updating of document policies 120, as well as the association of a specific document policy 120 with a specific document 115. The document policy server 116 also includes one or more policy interface modules 124 to facilitate interfacing of the document policy server 116 with the document policy database 118, a document generation machine 114, and a document access application 104.

In one example embodiment, the document policy server 116 may have access to a Lightweight Directory Access Protocol (LDAP) database 125, so as to enable the policy module 122 to determine whether the user belongs to a group (e.g., a group or level in an organizational hierarchy) that is authorized to access a relevant portion of a digital content item.

Returning to the document access application 104, a policy interface module 126 enables a policy enforcement module 128 to issue requests, with respect to a specific document 115, to the document policy server 116 for one or more policies 120 associated with a document 115. Such requests may include, for example, an identifier 130 associated with a particular document 115 so as to enable the document policy server 116 to retrieve appropriate document policies 120 associated with the relevant document 115.

The document access application 104 may, prior to providing any access to a particular document 115, also require user identification (e.g., a username/password pair, biometric identification or single-use passwords, tokens or smartcard). The user identification may be utilized locally, by a policy enforcement module 128, to selectively provide access to portions of the document 115 or may, in another embodiment, be communicated to the document policy server 116, which may retrieve and communicate information (e.g., keys) which allow the policy enforcement module 128 selectively to provide access to portions of the document 115. Accordingly, in one embodiment, an entity identifier in the example form of a user identifier may be utilized at the server side to determine permissions with respect to a particular electronic document 115, or may in another embodiment be utilized on the client side to determine permissions, based on a full policy communicated to the document access application 104. In this way, both the online and offline enforcement of policies may be achieved. In the various embodiments, a machine identifier identifying a machine, and/or an application identifier identifying an application may also be used to determine permissions with respect a digital content item. However, for illustrative purposes, a user identifier is discussed below.

Figure 2:
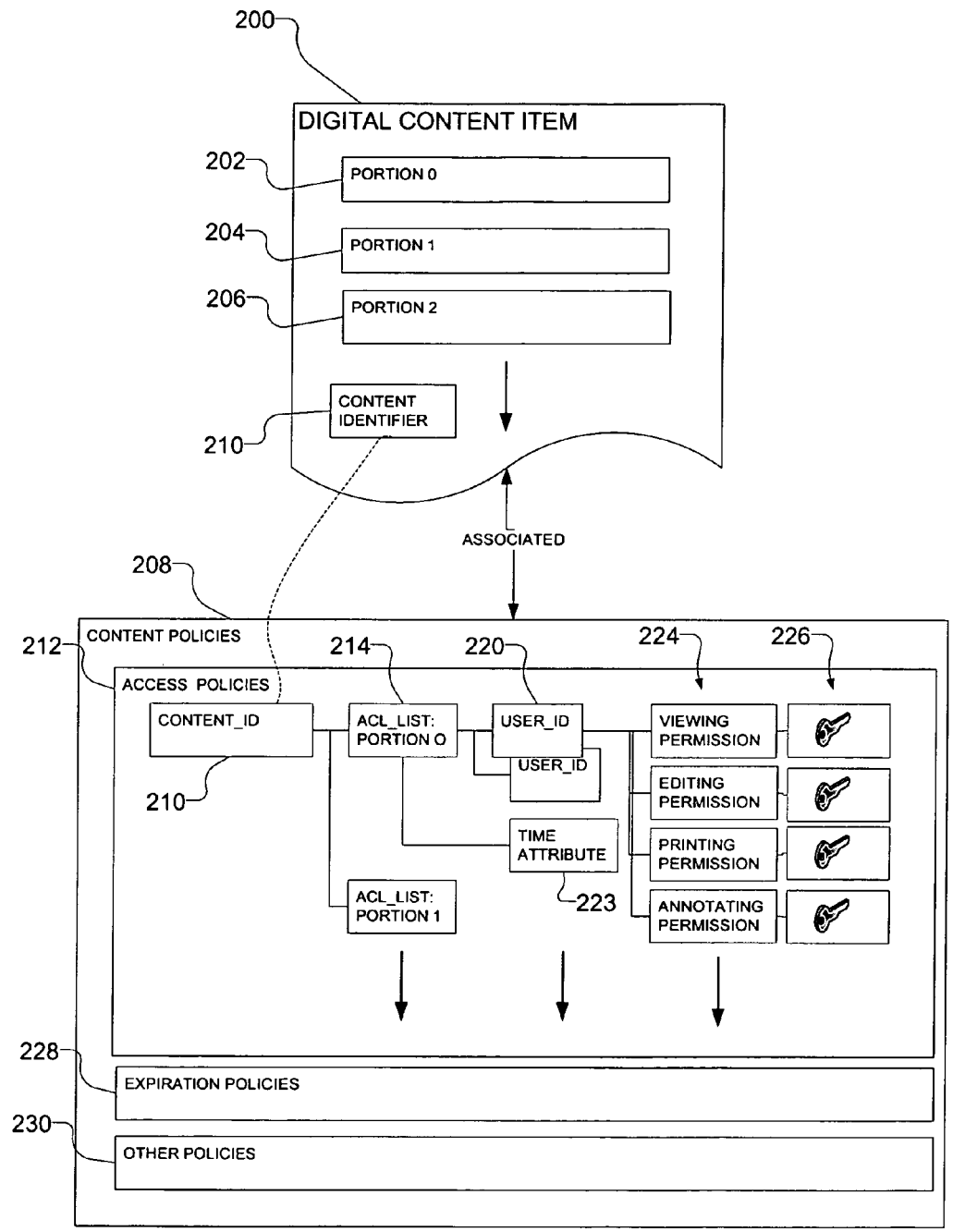
FIG. 2 is a block diagram illustrating a data structure for a policy as may be deployed within an access management system, according to an example embodiment.

FIG. 2 is a block diagram illustrating an example digital content item 200 (e.g., a digital document, photograph, video or audio file) having one or more content policies 208 associated therewith. The association between the digital content item 200 and content policies 208 may be achieved by storing the content policies 208 in a database in association with a content identifier 210 for the relevant digital content item 200.

The digital content item 200 is shown to include multiple portions 202, 204, 206, which may be mutually exclusive or may overlap (e.g., share common digital content). Examples of the definition and/or identification of portions of a digital content item are described more fully elsewhere in the present specification.

The content policies 208 may include, for example, access policies 212, expiration policies 228 and any one of a number of other policies 230 (e.g., distribution policies, etc.). Taking the access policies 212 as an example, a particular content identifier 210, uniquely identifying a particular digital content item 200, may be associated with multiple access control lists 214, each access control list (ACL) 214 being associated with a respective portion of the digital content item. Accordingly, each access control list 214 includes a portion identifier identifying a respective portion of which it is associated.

Each access control list 214 in turn specifies a number of controls with respect to access of the corresponding portion of the digital content item 200. For example, the access control list 214 may be associated with the portion 202 of the digital content item 200, and specify access controls with respect to this portion. The access controls specified in terms of the access control list 214 may be entity specific (e.g., as identified by a particular user identifier 220), and may define viewing, editing, printing, annotating and form filling permissions 224, merely for example. Each of the permissions 224 may in turn be associated with a respective key (e.g., a symmetric or an asymmetric key) 226, the relevant key 226 being usable by an access application to decrypt the respective portion of a digital content item, and to enable access to the respective portion in accordance with the associated permission. In one embodiment, each of the keys associated with the permissions may be an asymmetric key, thereby enabling the same key to be utilized to both encrypt and decrypt the relevant portion.

In addition, the access control list 214 associated with each portion may include a time (or temporal) attribute 222 specifying, for example, a time period for which the relevant portion is valid, or a time period for which any one or more of the permissions are valid. The time periods reflected in the time attribute 222 may be absolute (e.g., expressed with a reference to a fixed date) or relative (e.g., expressed with reference to an event).

Figure 3:
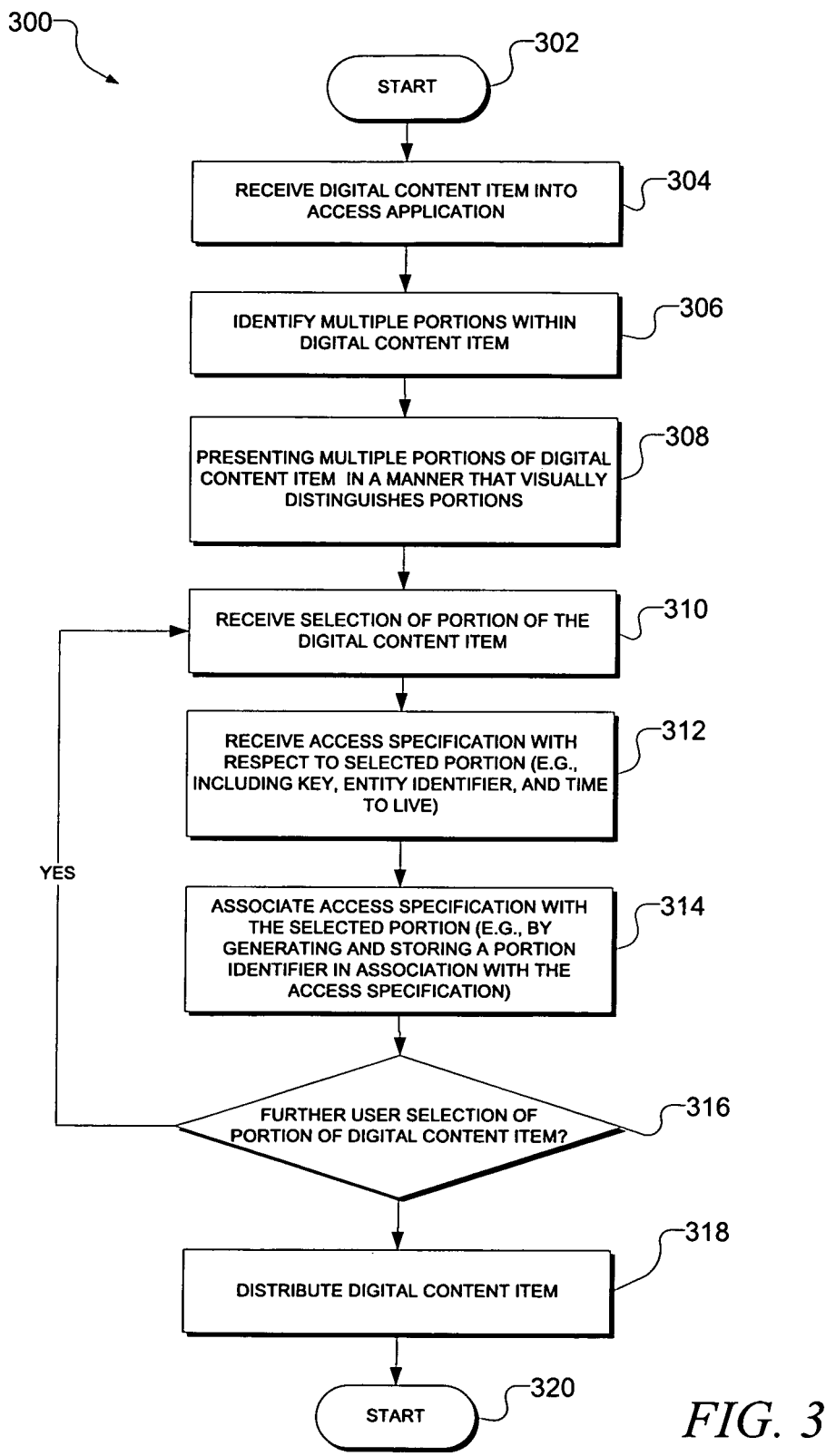
FIG. 3 is a flowchart illustrating a method, according to an example embodiment, to associate an access specification with a portion of a digital content item.

FIG. 3 is a flow chart illustrating a method 300, according to an example embodiment, to associate an access specification (e.g., a policy 120 or some other specification providing constraints or permissions with respect to access of a content item) with at least one portion of a digital content item having multiple portions.

The method 300 commences at 302 and proceeds to operation 304, where a digital content item 200 is received by a creation application 113. For example, where the digital content item is a PDF document, the PDF document may be loaded into application memory of a PDF reader application (e.g., Adobe® Acrobat®). The content item 200 may be retrieved into the application memory as a result of being authored by an author using the creation application 113, being retrieved from local memory associated with a generation machine 114 on which the creation application 113 is executing or being retrieved by the creation application 113 from a remote storage location (e.g., the database 112) via a network.

At operation 306, multiple portions of the digital content item 200 are identified. The identification of the multiple portions may be performed automatically or manually, in various embodiments. For example, where the digital content item 200 is an electronic document, paragraphs may be automatically identified as respective portions of the electronic document. Similarly, where the digital content item 200 is a digital photograph, color or other image characteristic transitions may be utilized to automatically identify portions of a digital image. In a further example, where the digital content item 200 is a video, scene transition techniques may be utilized to identify distinct portions of a video, each portion comprising a sequence of video frames. In yet another embodiment, where the digital content item 200 is an audio file, deltas in audio characteristics may be used to automatically define portions of the audio file.

Further, where the multiple portions of the digital content item 200 are manually defined, the creation application 113 may provide any one of a number of mechanisms whereby a user may select, indicate or define a portion of the digital content item 200. For example, this may be achieved by highlighting portions of digital text, utilizing various manual mask definition tools provided by an image creation application 113 (e.g., Adobe® Photoshop®), using splicing tools provided by many video editing applications (e.g., those applications included in the Adobe® Production Suite), or the audio selection tools provided by digital audio editor computer programs (e.g., the Adobe® Audition® program). With respect to audio digital data for example, the identification of portions of the audio data may include identifying multiple tracks that together constitute a composite audio file.

At operation 308, the creation application 113 may present one or more portions of the digital content item 200 in a manner that visually (or otherwise) distinguishes these portions. For example, portions of the digital content item may be distinguished utilizing annotations (e.g., highlights or any other visually distinguishing characteristic) so that a user is readily able to discern the portions of the digital content item 200 for selection purposes.

At operation 310, the creation application 113 receives a selection of a portion of the digital content item 200. This selection may be received via interface of the creation application 113 (e.g., a graphical or audio user interface).

At operation 312, the creation application 113 receives an access specification (e.g., a policy) with respect to the selected portion. The receiving of access specification may include defining, creating or authoring of the access specification (e.g., authoring an access policy 212 as described above with reference to FIG. 2), or a manual or automatic selection of a pre-existing access specification. To this end, the access specification may include an access control list (ACL) identifying entities (e.g., users or groups of users) that are granted varying degrees of access rights or permissions in terms of the access specification. In one example embodiment, the creation application 113 may, via the policy server 116, access of the LDAP database 125 to retrieve a list of users and organization information that may be presented to a user so as to enable the user conveniently to identify and select users (or groups of users) to which the access rights and permissions pertain.

In addition to defining various rights, permissions or constraints, the access specification may also have one or more keys associated therewith, and a time-to-live (TTL) or other exploration policy defining temporal characteristics of the access specification.

At operation 314, the creation application 113 proceeds to associate the access specification, received at operation 312, with the portion of the digital content item selected at operation 310. This association may be achieved in cooperation with the policy server 116, for example, by instructing the policy server 116 to store the access specification (e.g., an access policy 212) in association with a content identifier 210 in a policy database (e.g., the document policy database 118). Specifically, in an example embodiment, the policy module 122 may deploy an included association module to store the content identifier 210 in association with one or more access specifications in the policy database 118. It will be appreciated that the association of the access specification with the selected portion of the digital content item may be achieved in any number of ways.

At decision operation 316, a determination is made as to whether any further user selections of portions of the digital content item 200 have or are to be received. For example, a user of the creation application 113 may be prompted to determine whether further access specifications are to be associated with any further portions of a digital content item. In the case of a positive determination at decision operation 316, the method 300 loops back to operation 310, with the receipt of selection of a further portion of a digital content item, whereafter the method 300 cycles back through operations 312, 314 and 316.

On the other hand, following a negative determination at operation 316, the digital content item 200 may then be distributed or made available for distribution to consumers at operation 318. For example, with reference to FIG. 1, a document 115 may be uploaded to the document database 112 for distribution via the web servers 108 or the email servers 110 to the access application 104 of a consuming user. More specifically, an author user, having generated the document 115 on a document generation machine 114 may specify that the relevant document 115 is to be distributed by email via the email servers 110 to a select group of users. The method 300 then terminates at 320.

Figure 4:
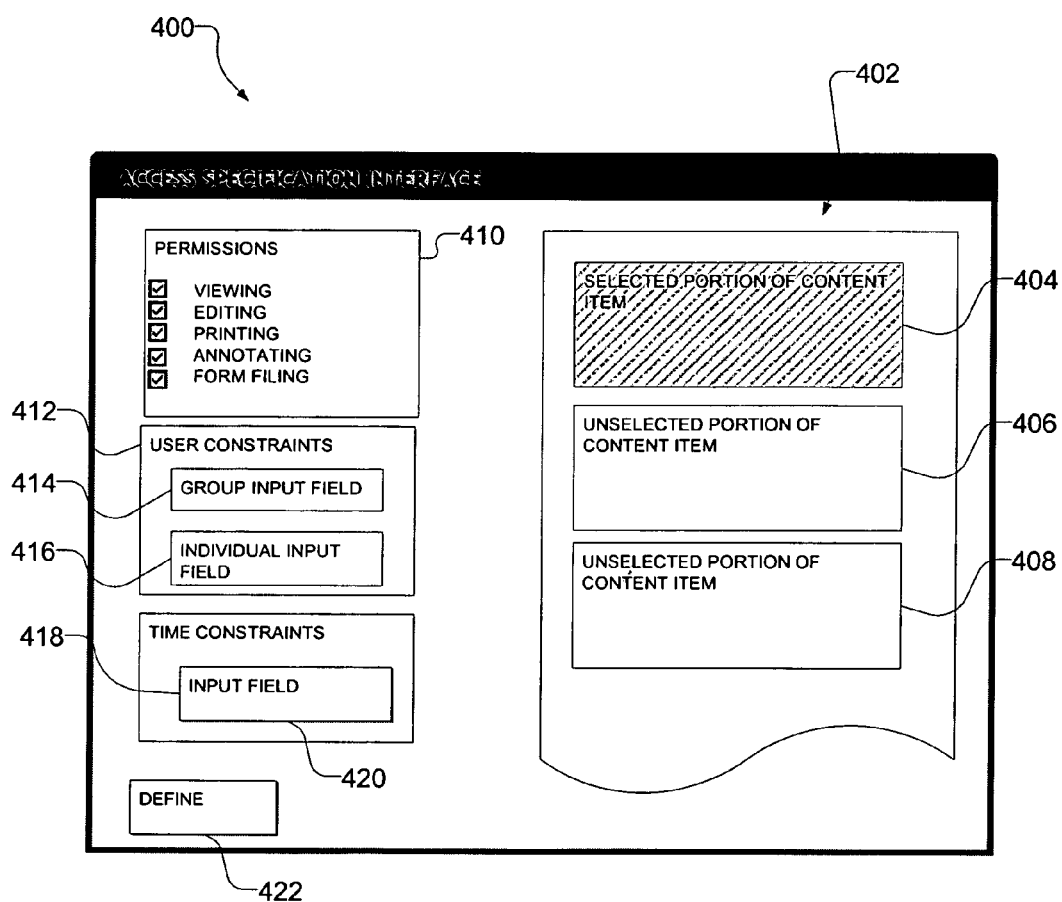
FIG. 4 is a user interface diagram, illustrating an example user interface that may be used in order to associate an access specification with at least a portion of a digital content item.

FIG. 4 is a user interface diagram illustrating an access specification interface 400, according to an example embodiment, that may be presented to an author user by the creation application 13, for example in the performance of the method 300. The access specification interface 400 may provide a visual representation of a digital content item 402 (e.g., an electronic document) within which various portions 404, 406, 408 are visually distinguished. The interface 400 furthermore enables a user selection of one or more of the portions (e.g., the portion 404 is shown in FIG. 4 to be selected).

The interface 400 further includes a permissions dialog box 410, containing a list of permissions that may be applied with respect to a selected portion of the digital content item 200. Each permission item within the list is accompanied by a check box, for example, which allows for user selection of one or more of the permissions from the list.

A user constraints dialog box 412 includes a group input field 414 into which an author user may input a group of users (e.g., a certain group, rank or level within an organization) to which the permissions identified in the permissions dialog box 410 may apply. Further, an individual input field 416 enables the author user to individually identify users to which the permissions may apply. In one example, the input fields 414 and 416 may be populated utilizing drop-down menus that present list of groups and/or users, based on information retrieved from the LDAP database 125, by the policy server 116, and communicated to the creation application 113.

A time constraints dialog box 418 enables an author user to provide time constraints, via the input field 420, to be applied with respect to either the permissions identified in permissions dialog box 410, users identified in the user constraints dialog box 412, or with respect to a selected portion of the content item. In the example embodiment, the inputs into the dialog boxes 410, 412 and 418 may collectively define an access specification (e.g., policy) to be defined with respect to a portion of the digital content item 402.

The interface 400 further includes a "define" button 422 which is user selectable to store a defined access specification in association with a selected portion of the digital content item 402. For example, responsive to user selection of the "define" button 422, an access control list (ACL) for one or more portions of the content item 402 may be stored in association with a content identifier unique to the digital content item 402.

Figure 5:
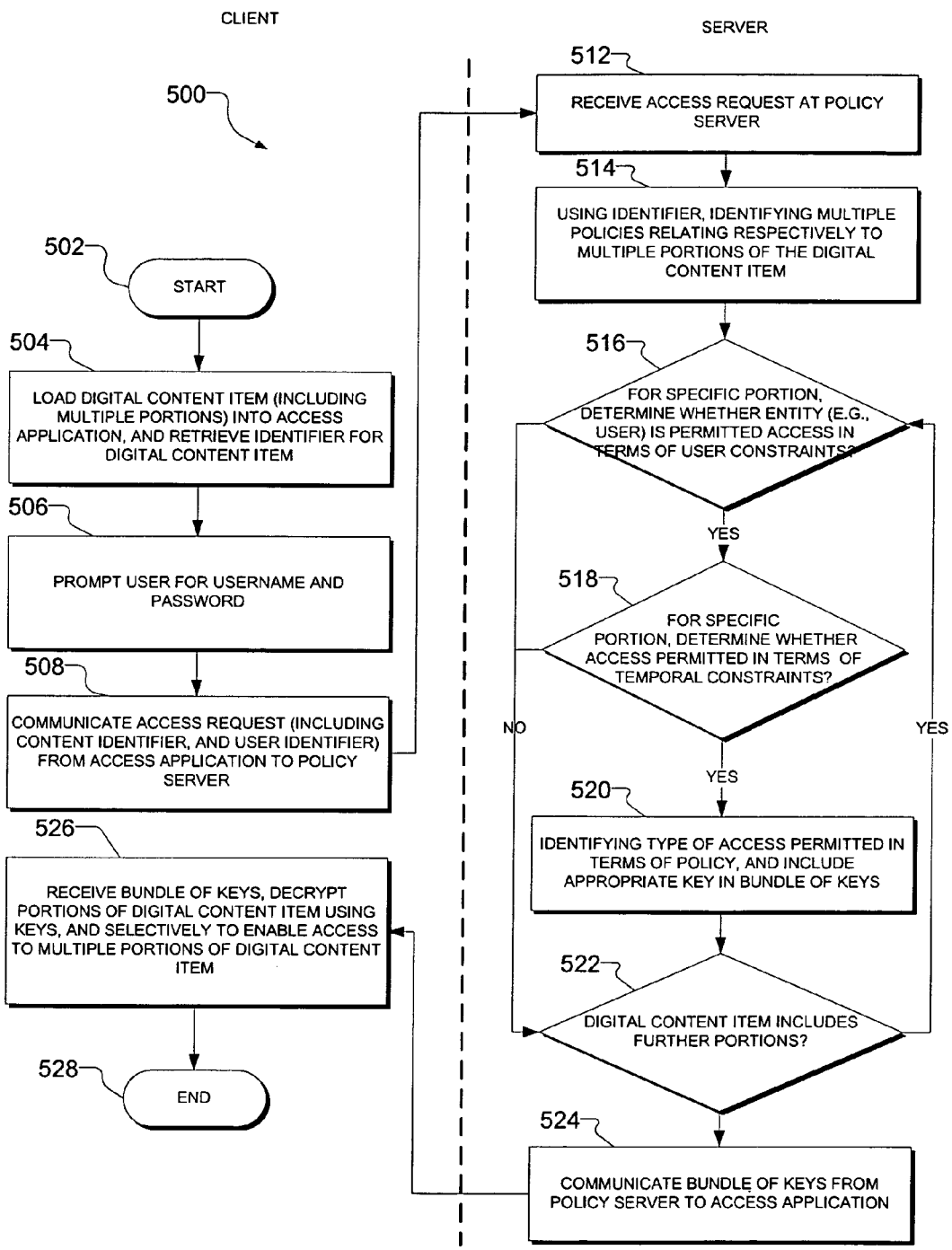
FIG. 5 is a flowchart illustrating a method, according to an example embodiment, to selectively enable access to each of multiple portions of a digital content item based on respective policies.

FIG. 5 is a flow chart illustrating a method 500, according to an example embodiment, to selectively enable access to each of multiple portions of a digital content item 200, based on access specifications (e.g., policies) associated with at least one of the multiple portions.

The method 500 commences at 502, and proceeds to operation 504 with the receiving (e.g., loading) of a digital content item, including multiple portions, into an access application 104 and the retrieval of a content identifier 210 associated with a digital content item 200. The retrieval of the content identifier 210 may, it will be appreciated, be achieved in various ways. For example, the content identifier 210 may simply be a numeric or alphanumeric identifier that is stored as part of the metadata associated with the digital content item 200. Alternatively, the content identifier 210 may be generated, utilizing for example a hash function, based on data included within the digital content item 200. In this way, the content identifier 210 may be utilized to confirm that the digital content item has not been modified subsequent to generation of the content identifier 210.

At operation 506, the access application 104 may prompt the user for a user identifier. To this end, a dialog box may be displayed to the user to prompt the user for a user name and password to be used in verifying access rights or permissions that may have been granted to the user with respect to the digital content item 200. Of course, many other user identifiers may be captured at operation 506, such as a biometric identifier in the example form of a fingerprint, or digital identifier stored on a token belonging to the user.

At operation 508, the access application 104 communicates a request, including the content item identifier and the user identifier retrieved at operations 504 and 506, to a policy server, such as for example the document policy server 116.

At operation 512, the access request is received at the policy server 116 whereafter, at operation 514, using the content identifier 210, a policy module 122 proceeds to identify multiple policies 120, each relating respectively to one of the multiple portions of the digital content item 200. For example, the content identifier 210 may be utilized to identify an access control list (ACL) 214 associated with each of multiple portions of a digital content item 200.

At operation 516, with respect to a specific portion, the policy module 122 may then determine whether the user, associated with the received user identifier, is permitted access to the relevant portion in terms of user constraints. To this end, the policy module 122 may utilize authentication information included in the user identifier (e.g., a user name and password, or biometric identifier) to authenticate the relevant user and to determine whether the user is permitted to access (e.g., view, edit, print, annotate or otherwise access) the relevant portion of the digital content item 200. The authentication of the user may include accessing the LDAP database 125 in order to determine attributes of the user (e.g., status within an organization).

In the case of a positive determination at decision operation 516, the method 500 progresses to decision operation 518, where a determination is made as to whether the access is permitted in terms of temporal constraints (e.g., as specified by the time attribute 222). For example, a time attribute 222 may specify that the relevant portion of a document is extant only until a specific date, whereafter the relevant portion is no longer valid and accordingly access to the portion is prohibited.

In the case of a positive determination at decision operation 518, at operation 520 the policy module 122 may identify the types of accesses permitted by the user, in terms of the access control list (or other policy or access specification), and include appropriate keys in a bundle of keys to be communicated back to the access application. To this end, and as explained above with reference to FIG. 2, each of the permissions may be associated with a unique key so as to "unlock" certain functionality or access capabilities with respect to the relevant portion of the digital content item.

At decision operation 522, a determination is made whether the relevant digital content item 200 includes further portions, for example by determining whether further access control lists (ACLs) are associated with the relevant content identifier 210. If so, the method 500 loops back to decision operation 516. It will also be noted that, in the event of a negative determination at either of decision operations 516 or 518, the method 500 advances to decision operation 522.

At operation 524, the policy server 116 then communicates the bundle of keys, generated at operation 522, to the access application 104, for example utilizing interface modules 124 and 126 of the policy server 116 and access application 104 respectively.

At operation 526, the access application 104 receives the bundle of keys via the interface module 126, and communicates these keys through to the policy enforcement module 128. The policy enforcement module 128, in turn, decrypts portions of the digital content item 200 utilizing the keys, thereby selectively enabling varying degrees or types of access to the multiple portions of the digital content item 200. The method 500 then ends at 528.

While in the above example embodiment, the policy module 122 on a policy server 116 is described as performing the operations 516-522, it will be appreciated that, in another embodiment, a policy enforcement module 128, which resides locally within an access application 104, may perform certain or all of these operations. In this example embodiment, the policy server 116 may simply operate to identify a collection of policies applicable to a particular digital content item, and communicate these policies to the local policy enforcement module 128. The local policy enforcement module 128 may then perform operations similar to those described above with reference to operations 516-522 in order to generate a collection of keys to decrypt and provide various degrees of access to portions of a digital content item.

Figure 6:
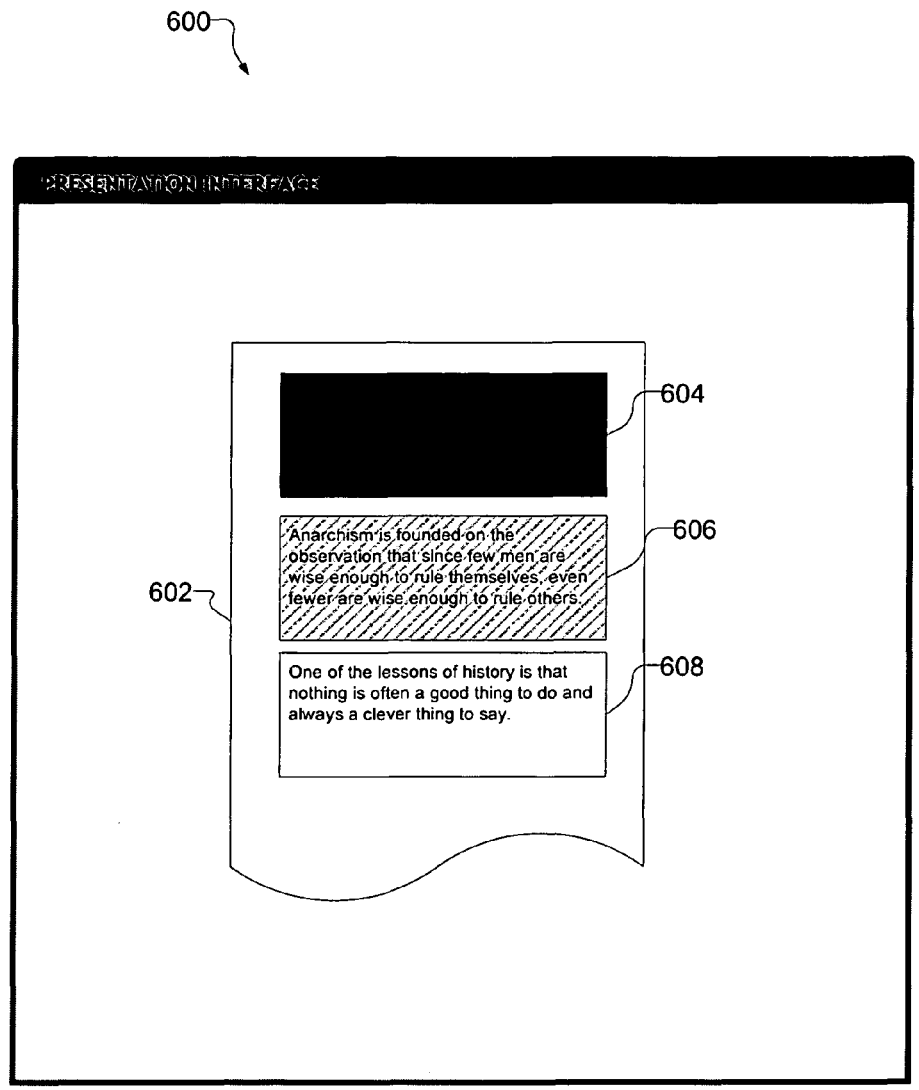
FIG. 6 is a user interface diagram, illustrating an example digital content item, including a portion to which access has been restricted utilizing any one of the methodologies described herein.

FIG. 6 is an interface diagram illustrating a presentation interface 600, according to an example embodiment, whereby access to portions of digital content is selectively enabled and disabled. Specifically, the interface 600 shows a representation of a digital content item 200 in the form of an electronic document 602 within which a first paragraph 604 is shown as being redacted, a second paragraph 606 is shown to be viewable but not editable, and a third paragraph 608 is shown to be both viewable and editable. Accordingly, by presenting the presentation interface 600, the access application 104 selectively enables and disables access to multiple portions of the digital content item.

Figure 7:
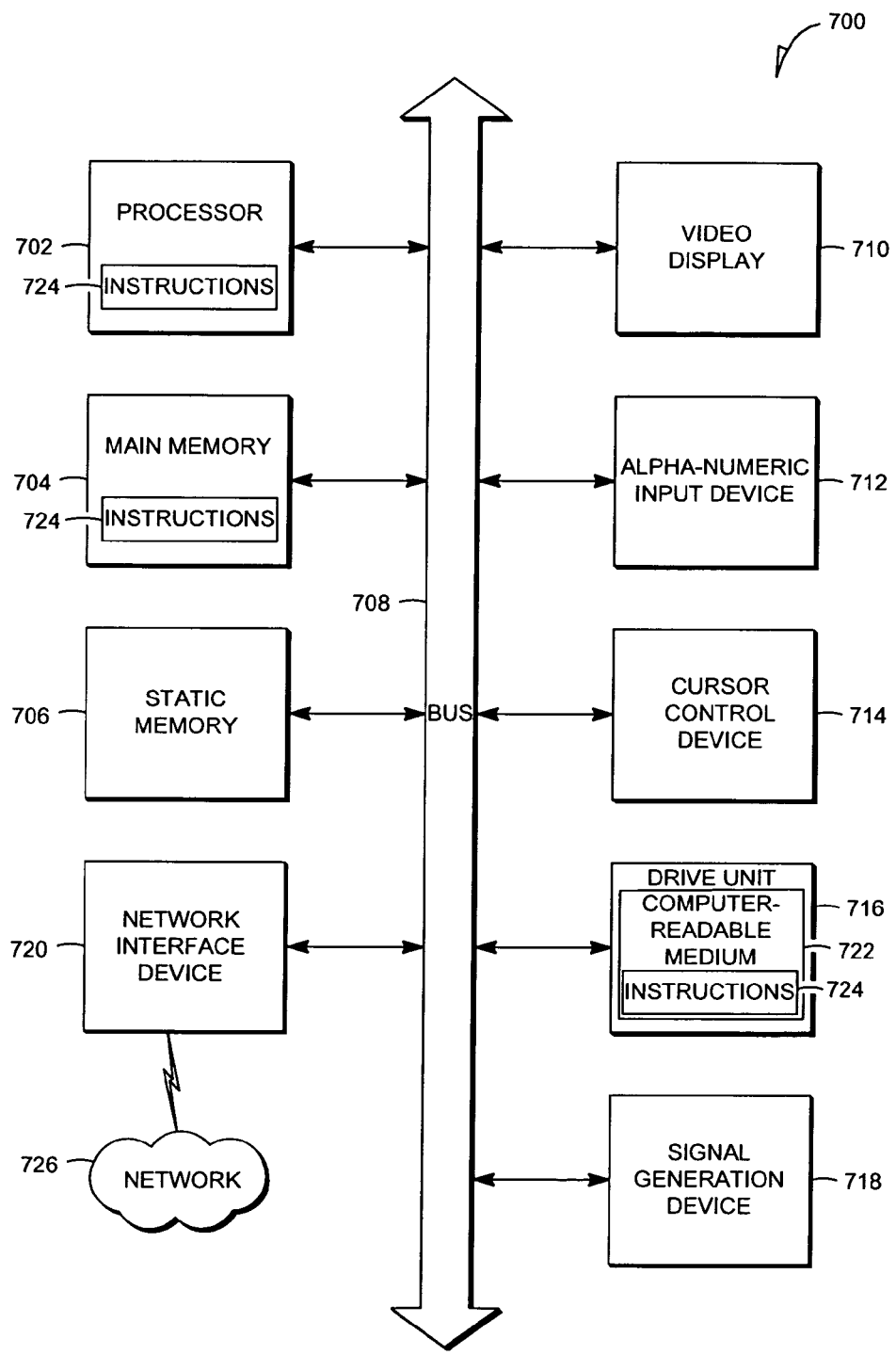
FIG. 7 is a block diagram illustrating a machine, in an example form of a computer system, within which instructions may be executed for causing the machine to perform any of the methodologies described herein, or within which any one of the example data structures described herein may be stored.

FIG. 7 is diagrammatic representation of machine in the example form of a computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media.

The software 724 may further be transmitted or received over a network 726 via the network interface device 720 utilizing any one of a number of well-known transfer protocols (e.g., HTTP).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived there from, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure.

This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
receiving a request to access a digital content item that includes multiple portions, the request including a content identifier associated with the digital content item, the multiple portions having at least some common digital content;
responsive to the request, identifying, using the content identifier, an access control list for each portion of the multiple portions of the digital content item, the access control list comprising a portion identifier of the each portion of the multiple portions, at least one control associated with the each portion, and a temporal attribute specifying a time period that the each portion is accessible; and
selectively enabling access to the each portion of the multiple portions of the digital content item based on the access control list that comprises the portion identifier of the respective portion of the digital content item.

2. The method of claim 1, wherein the request to access the digital content item is received from an access application configured to provide access to the digital content item.

3. The method of claim 1, wherein the request includes an entity identifier associated with an entity requesting the access to the digital content item, and wherein the selective enablement of the access to the multiple portions is performed using the entity identifier.

4. The method of claim 3, wherein the entity identifier is at least one of a group of identifiers including a user identifier identifying a user, a machine identifier identifying a machine, and an application identifier identifying an application.

5. The method of claim 1, wherein the selective enablement of the access includes selectively providing keys to enable the access to the multiple portions of the digital content item.

6. The method of claim 1, wherein the selective enablement of the access includes selectively providing at least one permission with respect to at least one portion of the multiple portions, the at least one permission being from a group including a viewing, editing, printing, annotating and form filling permission.

7. A system comprising:
a processor-implemented interface module to receive a request from a client machine to access digital content that includes multiple parts: and
a processor-implemented policy module, responsive to the request:
to identify, using the content identifier, an access control list for each part of the multiple part of the digital content item, the access control list comprising a part identifier of the each part of the multiple parts, at least one control associated with the each part, and a temporal attribute specifying a time period that the each part is accessible, and
to selectively to enable access to the each part of the multiple parts of the digital content based on the access control list that comprises the part identifier of the each part of the multiple parts.

8. The system of claim 7, wherein the interface module is to receive the request to access the digital content via a network, and from an access application configured to provide access to the digital content.

9. The system of claim 7, wherein the request includes an access identifier associated with an entity requesting the access to the digital content, and wherein the policy module is selectively to enable access to the multiple parts of the digital content using the access identifier.

10. The system of claim 7, wherein the policy module is selectively to provide keys to enable the access to the multiple parts of the digital content.

11. The system of claim 7, wherein the policy module is to selectively provide at least one permission with respect to at least one of the multiple parts of the digital content, the at least one permission being from a group including a viewing, editing, printing, annotating and form filling permission.

12. A non-transitory machine-readable medium having instructions that, when executed by a machine, cause the machine to perform a method comprising:
receiving instructions to receive a request to access a digital content item that includes multiple portions, the request including a content identifier associated with the digital content item, the multiple portions having at least some common digital content;
identifying instructions, responsive to the request, to identify, using the content identifier, an access control list for each portion of the multiple portions of the content item, the access control list comprising a portion identifier of the each portion of the multiple portions, at least one control associated with the each portion, and a temporal attribute specifying a time period that the each portion is accessible; and
enabling instructions to selectively enable access to the each portion of the multiple portions of the digital content item based on the access control list that comprises the portion identifier of the each portion of the multiple portions.

* * * * *